(12) United States Patent  (10) Patent No.: US 8,692,647 B2
Bailey et al.  (45) Date of Patent: Apr. 8, 2014

(54) RESISTOR GRID ASSEMBLY

(75) Inventors: Bradley S. Bailey, Peoria, IL (US); Gerald M. Brown, Cedarville, OH (US)

(73) Assignee: Caterpillar Inc., Peoria, IL (US)

( * ) Notice: Subject to any disclaimer, the term of this patent is extended or adjusted under 35 U.S.C. 154(b) by 82 days.

(21) Appl. No.: 13/326,875

(22) Filed: Dec. 15, 2011

(65) Prior Publication Data

US 2013/0154523 A1 Jun. 20, 2013

(51) Int. Cl.
*H01C 3/00* (2006.01)

(52) U.S. Cl.
USPC ............................. 338/279; 338/280; 338/281

(58) Field of Classification Search
USPC ......... 338/279, 280, 281, 283, 284, 287, 288, 338/291
See application file for complete search history.

(56) References Cited

U.S. PATENT DOCUMENTS

| | | |
|---|---|---|
| 4,651,124 A | 3/1987 | Kirilloff |
| 4,654,627 A * | 3/1987 | Harkness ...................... 338/319 |
| 5,157,373 A | 10/1992 | Bertram |
| 5,159,310 A * | 10/1992 | Cummins et al. ............. 338/280 |
| 5,221,917 A | 6/1993 | Cummins |
| 5,304,978 A * | 4/1994 | Cummins et al. ............. 338/280 |
| 5,686,880 A | 11/1997 | Cummins et al. |
| 6,081,183 A | 6/2000 | Mading |
| 2010/0194523 A1 | 8/2010 | Kamal et al. |

FOREIGN PATENT DOCUMENTS

| | | |
|---|---|---|
| KR | 1020070029286 | 3/2007 |
| KR | 1020090125343 | 12/2009 |

* cited by examiner

*Primary Examiner* — Kyung Lee
(74) *Attorney, Agent, or Firm* — Jeff A. Greene (57) ABSTRACT

A resistor unit adapted to be used in a resistor grid assembly. The resistor unit includes a supporting element and a resistor element. The supporting element has an aperture formed therein. The resistor element has a body portion and a tip portion at an end, which is adapted to be received in the aperture to mount the resistor element to the supporting element. Further, a tab extends from the end of the resistor element forming a part of the resistor element. The tab is configured to provide a heat shield between the supporting element and the resistor element.

20 Claims, 5 Drawing Sheets

RESISTOR GRID ASSEMBLY

TECHNICAL FIELD

The present disclosure relates to a resistor grid assembly for a dynamic braking system in a machine and more particularly to a resistor unit for the resistor grid assembly.

BACKGROUND

Resistor grid assemblies used for dynamic braking in machines, such as, electric and diesel-electric locomotives, off-highway machines, and other heavy equipment are well known. Typically, the resistor grid assembly includes a plurality of resistor elements to dissipate the electric power generated during braking of the machine as heat. Thus, the resistor grid assembly may supplement the friction-based brakes and minimizes the wear in friction-based braking components of the machine. However, the generated heat may raise the temperature of adjacent components in the resistor grid assembly and may also lead to failure if the temperature exceeds a critical limit.

U.S. Pat. No. 4,651,124 discloses a heat-dissipating resistor unit having a plurality of connected fan-folded electrically conductive resistor elements. The resistor elements are supported within a rigid frame by studs affixed to loops of the resistance elements and corresponding heat-resistant insulating elements. The heat-dissipating resistor unit further includes an insulating panel of organic material affixed to an inside surface of the frame and a metal heat shield surrounding the heat-resistant insulating elements positioned inwardly from the frame. However, the metal heat shield may need to be supported on the heat-dissipating resistor unit by one or more retaining rings.

SUMMARY

In one aspect, the present disclosure provides a resistor unit adapted to be used in a resistor grid assembly. The resistor unit includes a supporting element and a resistor element. The supporting element has an aperture formed therein. The resistor element has a body portion extending in a longitudinal direction and a tip portion at an end of the body portion. The tip portion is adapted to be received in the aperture to mount the resistor element to the supporting element. Further, a tab extends from the end of the resistor element in a transverse direction. The tab is configured to provide a heat shield between the supporting element and the resistor element.

In another aspect, the present disclosure provides a resistor grid assembly having a housing and two or more resistor units disposed in the housing. The resistor unit includes the supporting elements affixed to the housing. The supporting elements have multiple apertures formed therein. The resistor unit includes one or more resistor elements having the body portion extending in a longitudinal direction and the tip portion at an end of the body portion. The tip portion is adapted to be received in the multiple apertures to mount the resistor elements to the supporting element. Further, the tab extends from the end of the resistor element in the transverse direction. The tab is configured to provide a heat shield between the supporting element and the resistor element. The resistor grid assembly also includes a conducting member configured to electrically connect the two or more resistor units.

In yet another aspect, the present disclosure provides a dynamic braking system for a machine having a power source operatively associated with a plurality of drive motors to drive a set of drive wheels. The dynamic braking system includes a control unit configured to generate a braking signal based at least in part on an operator command. The braking signal reverses a torque polarity of the plurality of drive motors to generate electric power from the set of drive wheels. The resistor grid assembly is configured to receive the electric power. The resistor grid assembly includes the supporting element and the resistor element mounted to the supporting element. The resistor element is configured to dissipate at least a part of the electric power from the plurality of drive motors as heat energy. Further, the tab extends from the end of the resistor element forming a part of the resistor element. The tab is configured to provide a heat shield between the resistor element and the supporting element.

Other features and aspects of this disclosure will be apparent from the following description and the accompanying drawings.

DETAILED DESCRIPTION

Figure 1:
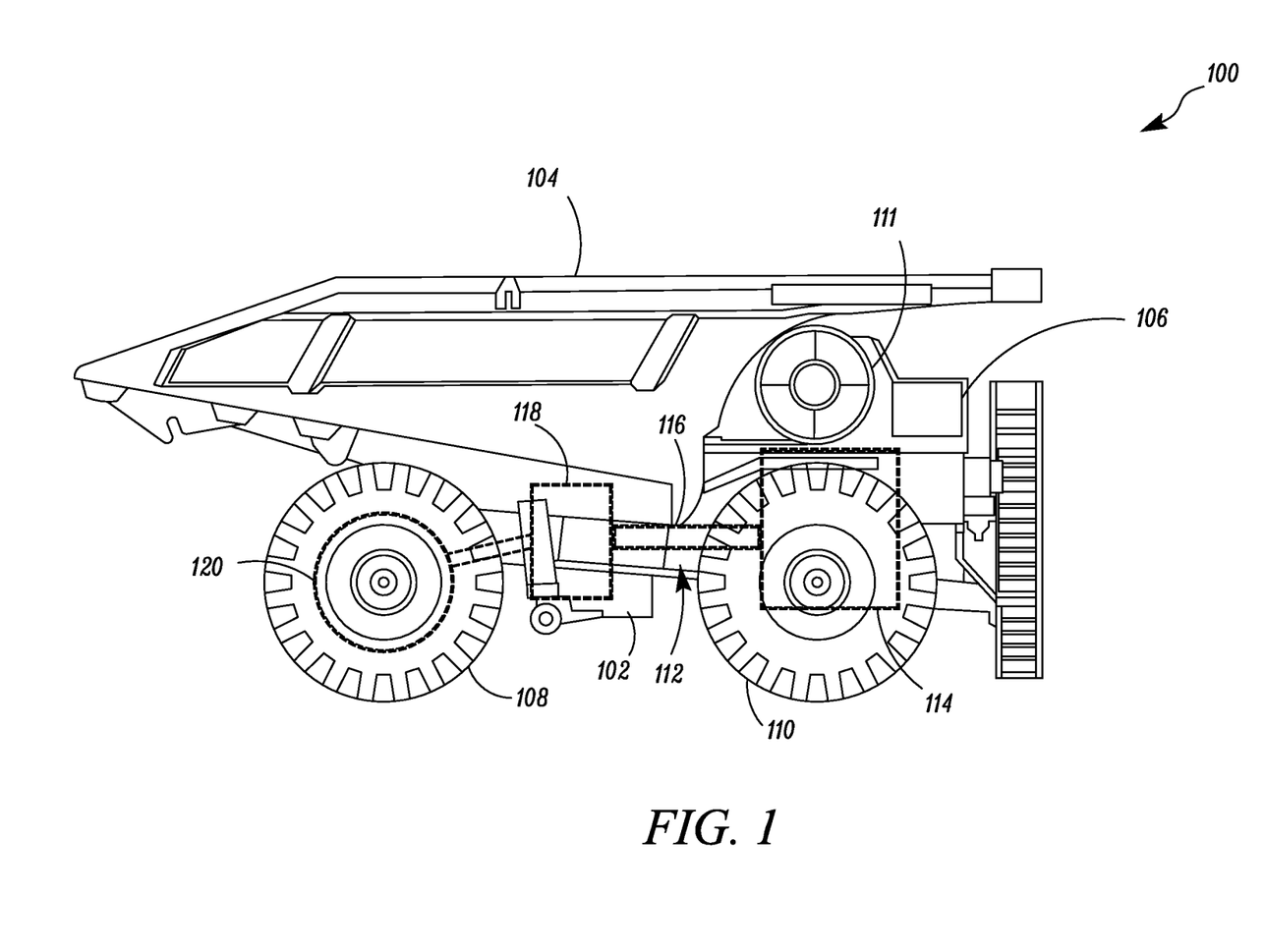
FIG. 1 illustrates a side view of a machine, according to an aspect of the present disclosure.

The present disclosure will now be described in detail with reference being made to the accompanying figures. A machine 100 in which disclosed embodiments may be implemented is schematically illustrated in FIG. 1. The machine 100 may be generically described as any machine having an electric drive which may be connected to one or more drive wheels. The machine 100 may include a vehicle such as a diesel engine locomotive, a subway tram, an off-highway truck or a vehicle used in mining, construction, quarrying, and other applications. However, it will be apparent, any other vehicle having an electric drive or an electric-only arrangement may be included in the machine 100.

For the purpose of the present disclosure, in FIG. 1, the machine 100 is illustrated as an off-highway truck. The machine 100 may include a chassis 102 to support various components of the machine 100. The machine 100 may include a dump body 104 supported on the chassis 102. The chassis 102 may further support an operator cab 106 defined as an enclosure. An operator occupying the operator cab 106 may control various functions of the machine 100 by issuing various operator commands by means of controls such as a joystick, a lever, a touch based user interface, or the like.

The machine 100 may further include a set of drive wheels 108 to propel the machine 100. In an embodiment, a set of idle wheels 110 may also be provided to steer the machine 100 in different directions. Further, the machine 100 may also include an articulated chassis for steering. Together, the set of drive wheels 108 and the set of idle wheels 110 may act as the ground engaging members for the machine 100. As illustrated in FIG. 1, the machine 100 also includes a resistor grid assembly 111 positioned adjacent to the operator cab 106 in the machine 100. However, it may be apparent, the resistor grid assembly 111 may be positioned anywhere based on the design and the available space in the machine 100.

The machine 100 of the present disclosure may be an electric machine having an electric drive 112. The electric drive 112 may provide the electric power to drive various components in the machine 100. In an embodiment, the electric power may be generated onboard by a generator, alternator, or another power-generation device, which may be driven by an engine or any other power source. Alternatively, the electric power may not be generated onboard but supplied externally from an overhead conductor via a pantograph trolley, a battery, a series of capacitors, or the like to drive the machine 100.

In the illustrated embodiment, the electric drive 112 includes a power source 114, which may be an engine, for example, an internal combustion engine such as a diesel engine, a gasoline engine, a natural gas engine or the like. The power source 114 may provide an output torque at an output shaft 116 in the machine 100. The output shaft 116 may be connected to a generator 118, which may be a multiple-phase alternating current (AC) synchronous alternator. During operation, the output shaft 116 rotates a rotor of the generator 118 to produce electric power, for example, in the form of alternating current (AC). This generated electric power may be used to run a plurality of drive motors 120 coupled directly or via intermediate assemblies to the set of drive wheels 108. For the purpose of the present disclosure, the drive motors 120 may be variable speed, reversible AC motors.

Figure 2:
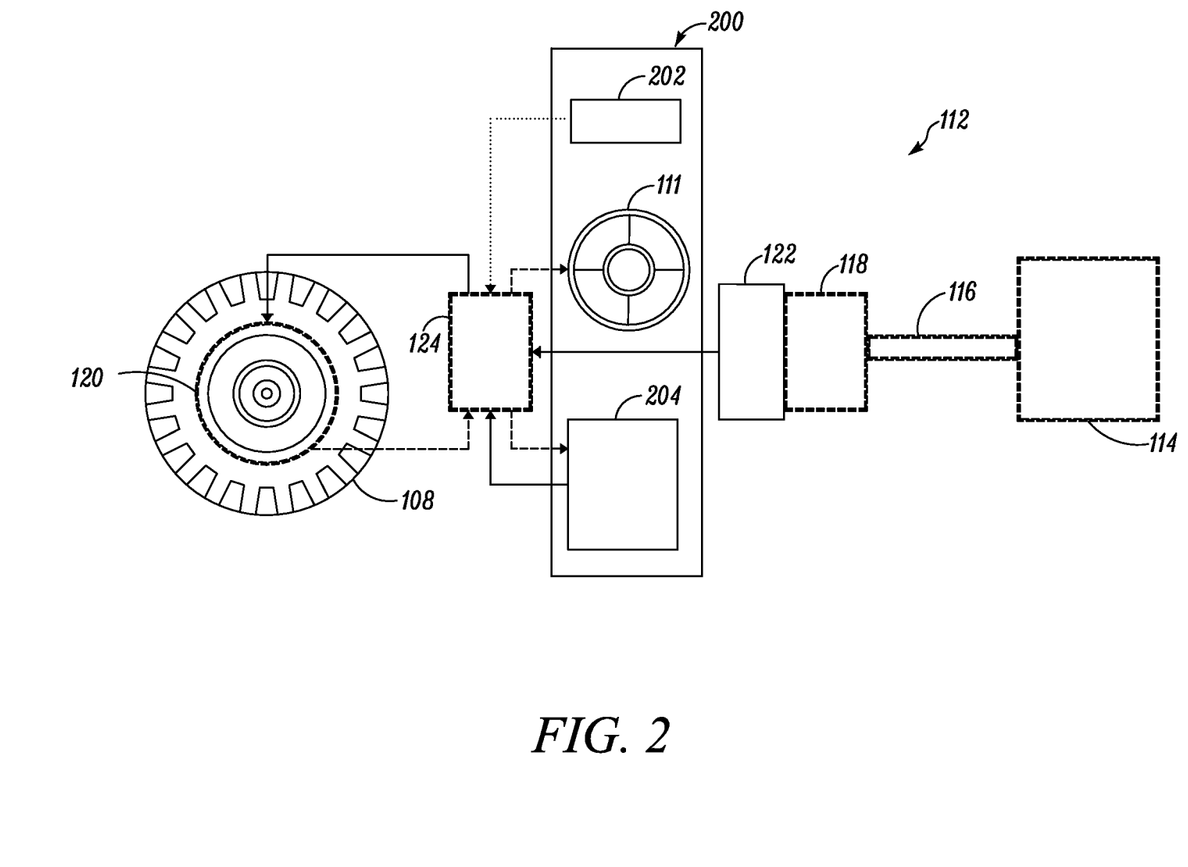
FIG. 2 illustrates a schematic diagram of an electric drive for the machine of FIG. 1.

A schematic of the electric drive 112 is illustrated in FIG. 2. The electric drive 112 of the present disclosure may be a direct series drive. FIG. 2 illustrates the arrangement of various components of the electric drive 112 in the machine 100. In the schematic diagram, the flow direction of the electric power in the system is denoted by arrows. The solid-lined arrows denote the flow of the electric power when the machine 100 is being propelled. Conversely, the flow of the electric power during a braking mode of the machine 100 is denoted by dash-lined arrows in FIG. 2. While, the dotted line arrow designate control line connection between components of the electric drive 112.

A person skilled in the art will understand that the generator 118 may produce electric power in the form of alternating current (AC) power. This electric power may be supplied to a rectifier 122 and converted to direct current (DC) power. The rectified DC power may be converted again to AC power by an inverter circuit 124. The inverter circuit 124 may be capable of selectively adjusting the frequency and/or pulse-width of the output, such that the drive motors 120 that are connected to an output of the inverter circuit 124 may be operated at variable speeds. In an embodiment, a plurality of inverter circuits 124 may be disposed in connection with the drive motors 120 in the machine 100.

FIG. 2 further illustrates a dynamic braking system 200 for the machine 100. The dynamic braking system 200 may be in connection with the drive motors 120 of the machine 100. Specifically, the dynamic braking system 200 may be operatively disposed in connection with the inverter circuit 124 in the machine 100. The dynamic braking system 200 may be configured to retard the propulsion of the machine 100 during braking mode as per an operator command in the machine 100.

According to the present disclosure, the dynamic braking system 200 may include a control unit 202, which may be a combination of, but not limited to, a set of instructions, a Random Access Memory (RAM), a Read Only Memory (ROM), flash memory, a data structure, and the like. The control unit 202 may be configured to receive the operator command in the machine 100. Further, the control unit 202 may determine whether to put the machine 100 in the braking mode or not, based at least in part on the operator command. To initiate braking of the machine 100, the control unit 202 may generate a braking signal (illustrated by dotted line) for the inverter circuit 124.

The braking signal may be received by the inverter circuit 124 in the machine 100. The braking signal may carry instructions to reverse a torque polarity of the drive motors 120. This makes the drive motors 120 to act as generators, using the mechanical power in the form of rotational energy from the set of drive wheels 108 to produce electric power. This electric power may be supplied back to the electric drive 112 in the machine 100.

The dynamic braking system 200 may further be configured to provide regenerative braking in the machine 100. For this purpose, the dynamic braking system 200 may include an energy storage unit 204. The energy storage unit 204 may include a battery, a plurality of capacitors or the like disposed in connection with the drive motors 120 in the electric drive 112. As during braking mode, the drive motors 120 may produce electric power, the energy storage unit 204 may store this electric power for later use in the machine 100.

Figure 3:
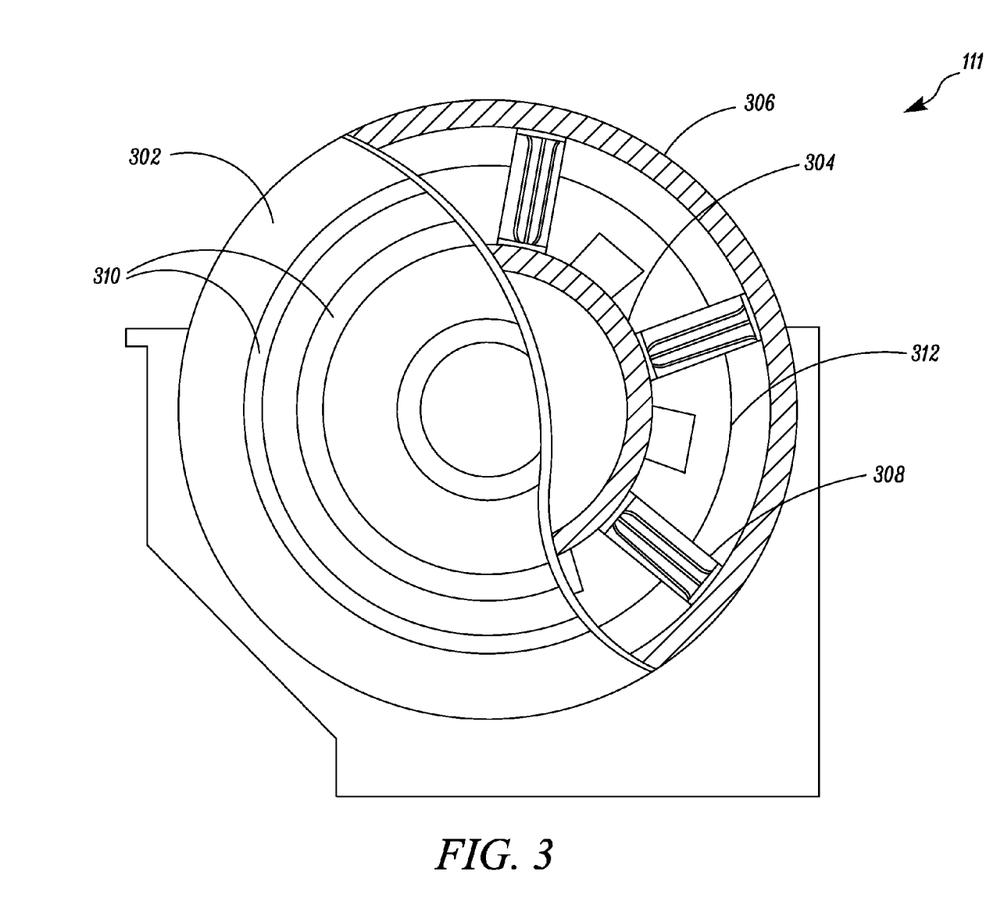
FIG. 3 illustrates a sectional view of a resistor grid assembly.

Further, the dynamic braking system 200 may include the resistor grid assembly 111. The resistor grid assembly 111 may dissipate some or all of the generated electric power in the form of heat. FIG. 3 illustrates a sectional view of the resistor grid assembly 111, according to an aspect of the present disclosure. The resistor grid assembly 111 includes a housing 302 which may provide support to various elements. The housing 302 may be in any shape and divided into one or more sections depending on the space constraints in the machine 100. In the illustrated example, the housing 302 has a cylindrical shape having an inner end 304 and an outer end 306. Further, the housing 302 is divided into four quadrants which are assembled with each other in the machine 100.

The resistor grid assembly 111 includes a resistor unit 308 disposed between the inner end 304 and the outer end 306 of the housing 302. The resistor grid assembly 111 may include two or more resistor units 308 that are closely packed in a stacked configuration abutting in an end-to-end orientation. The resistor units 308 may be uniformly arranged in the housing 302 to maintain air spaces between each other. This uniform spacing assures an adequate flow of cooling air between the resistor units 308 in the resistor grid assembly 111. Moreover, one or more cooling air vents 310 may be provided in the housing 302 for circulation of cooling air in the resistor grid assembly 111.

In the resistor grid assembly 111, the resistor units 308 may be connected in series to provide a continuous current path. For this purpose, a conducting member 312 may be disposed in the housing 302, electrically connecting the two or more resistor units 308 in the resistor grid assembly 111. The conducting member 312 may be a conductive wire, a weld, etc. The resistor units 308 may be connected in a manner such that the resistor grid assembly 111 may have two current circuits, a contactor power circuit and a chopper power circuit.

Figure 4:
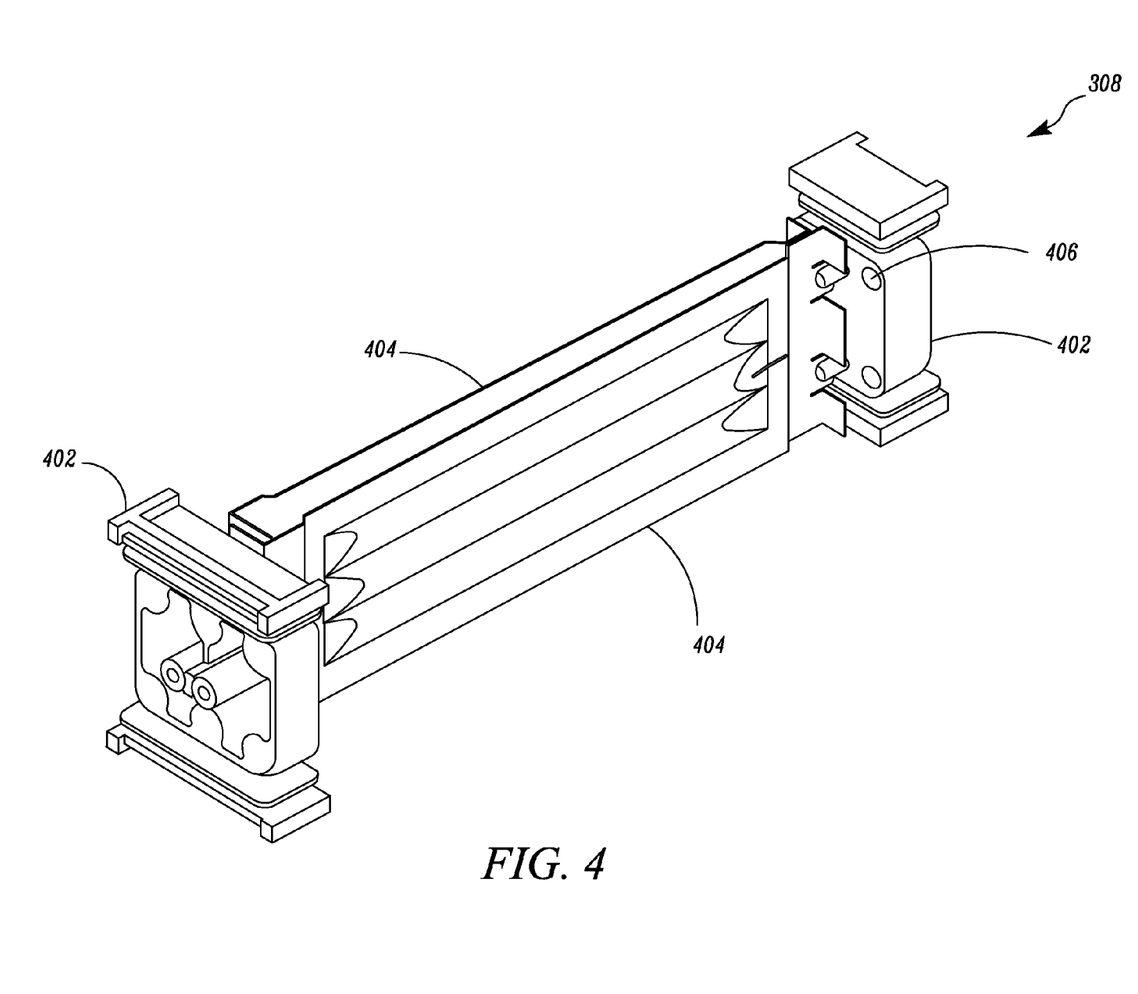
FIG. 4 illustrates a perspective view of a resistor unit.

FIG. 4 illustrates a diagrammatic view of the resistor unit 308, according to the present disclosure. The resistor unit 308 essentially includes a supporting element 402, and one or more resistor elements 404 mounted to the supporting element 402. The resistor unit 308 may further include stiffening ribs (not illustrated) configured to provide support to the one or more resistor elements 404. In the example illustrated, the one or more resistor elements 404 are mounted between a pair of supporting elements 402, which in turn may be affixed to the inner end 304 and the outer end 306 of the housing 302 of the resistor grid assembly 111. Further, the one or more resistor elements 404 may be arranged in a column, substantially parallel to each other in a close face-to-face relationship forming a transverse airflow path therebetween.

As illustrated, the supporting element 402 may be in the shape of a block made of insulating material such as silicon bonded laminated mica, ceramic, glass reinforced material, etc. However, any other material with insulating properties may be used as the supporting element 402. The supporting element 402 may be affixed to the housing 302 by some fastening member, such as, nuts and bolts, screws, etc. The supporting element 402 includes multiple apertures 406 formed therein. Further, the apertures 406 may not be extending through the supporting element 402.

Figure 5:
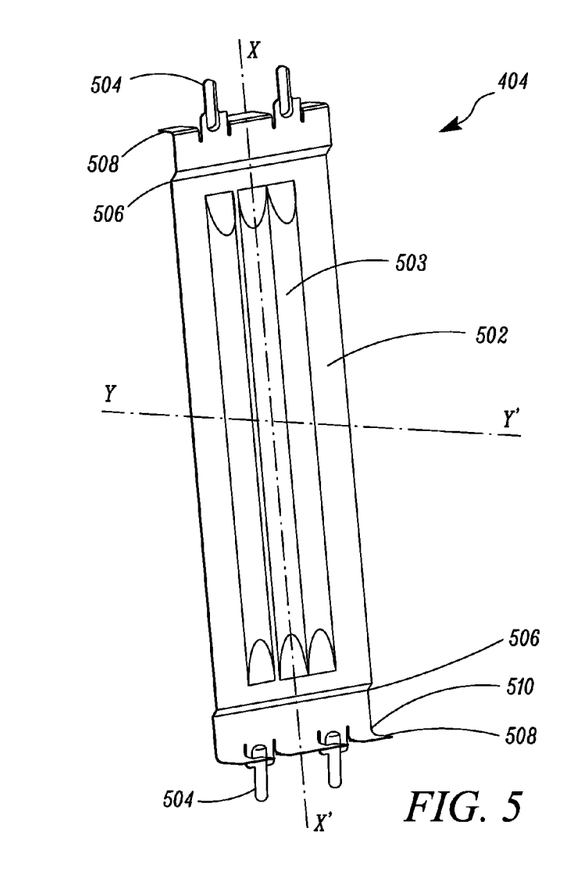
FIG. 5 illustrates a perspective view of a resistor element for the resistor unit of FIG. 4.

FIG. 5 illustrates a perspective view of the resistor element 404. The resistor element 404 may be formed from a continuous strip of resistive material such as stainless steel. The resistor element 404 may include a body portion 502 extending along a longitudinal direction XX' of the resistor element 404. In an embodiment, the resistor element 404 may also include a series of reflexed portions 503 disposed at opposite longitudinal sides in the body portion 502 of the resistor element 404. In an exemplary configuration, the resistor element 404 may extend in the range of about 200 millimeters to about 250 millimeters along the longitudinal direction XX'. In a specific example, the resistor element 404 may have a length of about 240 millimeters.

The resistor element 404 may have a tip portion 504 disposed at an end 506 of the body portion 502. Alternatively, the resistor element 404 may include two or more tip portions 504 disposed from both the ends 506. The tip portion 504 of the resistor element 404 may be adapted to be received in the aperture 406 of the supporting element 402. The aperture 406 may provide some clearance for movement of the tip portion 504 within. This allows for the resistor element 404 to move in the longitudinal direction XX' in the resistor unit 308 upon thermal expansion and thermal contraction.

Further, the resistor element 404 may also have a tab 508 disposed at the end 506. The tab 508 may be extending substantially in a transverse direction YY' of the resistor element 404. Alternatively, multiple tabs 508 may be oppositely extending from the resistor element 404 along the transverse direction YY'. The tab 508 may be formed by bending a portion 510 of the resistor element 404, such that the tab 508 forms a part of the resistor element 404. In an alternative embodiment, the tab 508 may be fastened to the body portion 502 at the end 506. The tab 508 may be configured to provide a heat shield between the supporting element 402 and the resistor element 404.

Figure 6:
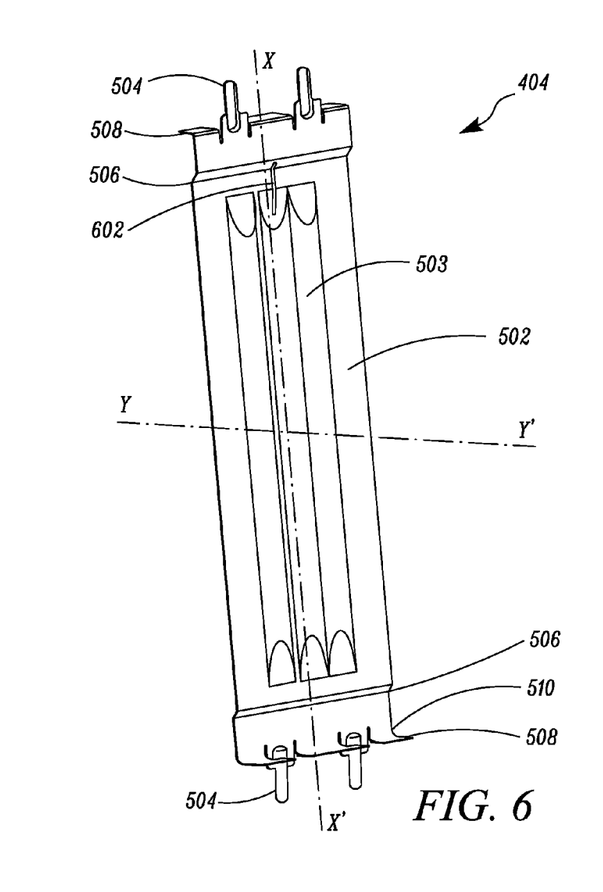
FIG. 6 illustrates a perspective view of the resistor element with a slot, according to an embodiment of the present disclosure.

FIG. 6 illustrates an embodiment of the resistor element 404 with a slot 602 formed therein. The slot 602 may be formed by cutting out some segment of the resistor element 404 during manufacturing. The slot 602 may extend along the length of the resistor element 404 in the longitudinal direction XX'. Further, the resistor element 404 may include a plurality of slots 602. In an exemplary configuration, the slot 602 may be rectangular in shape and extend in the range of 10 millimeters to 30 millimeters. In a specific example, the slot 602 may be 2 millimeters by 20 millimeters.

It will be apparent for certain operating conditions or due to a particular arrangement of the resistor elements 404 in the resistor unit 308, some cooling air may be required. For this purpose, the resistor grid assembly 111 may have a forced ventilation system (not illustrated), for example, a fan, a blower or the like disposed in the housing 302 for supplying the cooling air.

Industrial Applicability

The present disclosure is applicable to many machines, for example, a large off-highway truck, such as a dump truck, which are commonly used in mines, construction sites and quarries. The machine 100 may have a high payload capability and a travel speed of a few miles per hour when fully loaded. The machine 100 may further be required to operate in a variety of environments and negotiate steep inclines in dry or wet conditions.

Typically, to halt or slow down such machines, friction based brakes coupled to the set of drive wheels and idle wheels are used. These friction based brakes are effective, but may wear out with prolonged use. To overcome this, the machine 100 of the present disclosure may include the dynamic braking system 200, which may work in combination with or without these friction based brakes. The dynamic braking system 200 may supplement these friction based brakes in the machine 100 and thus helps in reducing the wear of such brakes.

The dynamic braking system 200 may act on the operator command to put the machine 100 in the braking mode. Specifically, the operator command may be received by the control unit 202 in the dynamic braking system 200. The control unit 202 generates the braking signal determined at least in part by the operator command. This determination or calculation may be based on various operating parameters of the machine 100, such as, the current speed, the current payload, the rate of acceleration, the desired speed and so forth.

Subsequently, the braking signal may be received by the inverter circuit 124 in the electric drive 112 of the machine 100. In the braking mode, the electric drive 112 may switch the torque polarity of the drive motors 120, which makes the drive motors 120 to act as generators. In this mode, the drive motors 120 may use the power from the set of drive wheels 108, which ultimately discharges the mechanical energy of the set of drive wheels 108 and achieves retarding of the machine 100. Further, the drive motors 120, consuming the mechanical power from the set of drive wheels 108, may generate electric power in the electric drive 112.

This generated electric power may be fed to the dynamic braking system 200 in the electric drive 112. The generated electric power, which may be in the form of AC, may be fed via the inverter 124 which converts AC electric power into DC electric power. In an embodiment, with the machine 100 having regenerative braking, a part of the generated electric power may be supplied to the resistor grid assembly 111 and the remainder of the generated electric power may be supplied to the energy storage unit 204 for later use in the machine 100. The generated electric power may pass through the resistor elements 404 in the resistor unit 308 of the resistor grid assembly 111 to be dissipated as heat.

Specifically, the heat is generated by the body portion 502 of the resistor element. This generated heat may be radiated to the supporting element 402 and raise the temperature of the supporting element 402 in the resistor unit 308. The normal continuous operating temperature for the supporting element 402 is in the range of 300 to 400 degrees Celsius, according to industry standards. For short intervals, the temperature of the supporting element 402 may reach higher values due to surges, but if the temperature rises above a critical temperature for extended periods of time, the lifetime of the supporting element 402 may be greatly reduced. Further, the mechanical stability of the resistor elements 404 may be compromised, causing the resistor elements 404 to bend and ultimately leading to rapid failure of the dynamic braking system 200.

To minimize the radiated heat flux from the body portion 502 to the supporting element 402, the resistor unit 308 of the present disclosure provides the tab 508 to the resistor element 404. The tab 508 may act as the heat shield between the supporting element 402 and the resistor element 404 in the resistor unit 308. Further, the tab 508 may also improve heat distribution by increasing surface area of the resistor element 404.

The tab 508 may be formed during manufacturing of the resistor element 404 by bending the portion 510 of the resistor element 404. The tab 508 may thus form the part of the resistor element 404, without the need of welding or any other joining process. Moreover, the tab 508 may add minimal cost to the manufacturing process, as the portion 510 of the resistor element 404 that is bent may otherwise be cut off and scraped.

Further, the generated heat may cause thermal stress in the resistor element 404. This may cause the resistor element 404 to buckle, and possibly touch the adjacent resistor elements 404 in the resistor unit 308, which may also lead to the failure of the resistor grid assembly 111. The slot 602 defined in the resistor element 404 of the present disclosure, may check the buckling of the resistor element 404 by providing a space for expansion or contraction of the material of the resistor element 404 in the resistor unit 308.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A resistor unit adapted to be used in a resistor grid assembly, the resistor unit comprising:
   a supporting element having an aperture formed therein;
   a resistor element having a body portion extending along a longitudinal direction and a tip portion disposed at an end of the body portion, the tip portion of the resistor element adapted to be received in the aperture to mount the resistor element on the supporting element; and
   a tab extending from the end of the body portion in a substantially transverse direction, the tab is configured to provide a heat shield between the supporting element and the resistor element.

2. The resistor unit of claim 1, wherein the supporting element is in the shape of a block made of insulating material.

3. The resistor unit of claim 1, wherein the resistor element is formed from a continuous strip made of resistive material.

4. The resistor unit of claim 1, wherein the resistor element includes a series of reflexed portions formed at opposite longitudinal sides.

5. The resistor unit of claim 1, wherein the resistor element further includes a slot adjacent to the end of the body portion.

6. The resistor unit of claim 5, wherein the slot extends along the longitudinal direction.

7. The resistor unit of claim 1, wherein the tab forms a part of the resistor element.

8. The resistor unit of claim 6, wherein the tab is formed by bending a portion of the resistor element.

9. The resistor unit of claim 1, wherein the tab is fastened to the body portion at the end.

10. A resistor grid assembly comprising:
    a housing;
    two or more resistor units disposed in the housing, the resistor unit including:
    a plurality of supporting elements affixed to the housing, the supporting elements have multiple apertures formed therein;
    one or more resistor elements having a body portion extending along a longitudinal direction and a tip portion disposed at an end of the body portion, the tip portion adapted to be received in the multiple apertures to mount the one or more resistor elements to the plurality of supporting elements, and
    a tab extending from the end in a transverse direction, the tab is configured to provide a heat shield between the supporting element and the resistor element; and
    a conducting member configured to electrically connect the two or more resistor units in the housing.

11. The resistor grid assembly of claim 10, wherein the housing is cylindrical in shape.

12. The resistor grid assembly of claim 10, wherein the supporting element is in the shape of a block made of insulating material.

13. The resistor grid assembly of claim 10, wherein the one or more resistor elements are disposed substantially parallel to each other in the housing.

14. The resistor grid assembly of claim 10, wherein the resistor element is formed from a continuous strip made of resistive material.

15. The resistor grid assembly of claim 10, wherein the resistor element includes a slot adjacent to the end of the body portion and extending along the longitudinal direction.

16. The resistor grid assembly of claim 10, wherein the tab forms a part of the resistor element.

17. The resistor grid assembly of claim 16, wherein the tab is formed by bending a portion of the resistor element.

18. The resistor grid assembly of claim 10, wherein the tab is fastened to the body portion at the end.

19. A dynamic braking system for a machine including a power source operatively associated with a plurality of drive motors to drive a set of drive wheels, the dynamic braking system comprising:
    a control unit configured to generate a braking signal based at least in part on an operator command, the braking signal reverses a torque polarity of the plurality of drive motors to generate electric power from the set of drive wheels; and
    a resistor grid assembly as set forth in claim 10.

20. The dynamic braking system of claim 19 further including an energy storage unit to store the electric power for use in the machine.

* * * * *

UNITED STATES PATENT AND TRADEMARK OFFICE
CERTIFICATE OF CORRECTION

| | |
|---|---|
| PATENT NO. | : 8,692,647 B2 |
| APPLICATION NO. | : 13/326875 |
| DATED | : April 8, 2014 |
| INVENTOR(S) | : Bailey et al. |

It is certified that error appears in the above-identified patent and that said Letters Patent is hereby corrected as shown below:

In the Specification

Column 6, line 1, delete "Industrial Applicability" and insert -- INDUSTRIAL APPLICABILITY --.

Signed and Sealed this
Fifteenth Day of September, 2015

Michelle K. Lee
*Director of the United States Patent and Trademark Office*